Feb. 5, 1935.  J. VILLARS  1,989,901
WELDING TONG
Filed Aug. 30, 1933

INVENTOR.
Joseph Villars
BY
ATTORNEY.

Patented Feb. 5, 1935

1,989,901

UNITED STATES PATENT OFFICE 1,989,901

WELDING TONG

Joseph Villars, Detroit, Mich.

Application August 30, 1933, Serial No. 687,513

3 Claims. (Cl. 219—8)

My invention relates to a new and useful improvement in a welding tong and has for its object the provision of a tong which will easily and quickly grip a wire strip and securely hold the same in position while at the same time permitting a ready and easy movement of the wire to feed the same while being used.

Another object of the invention is the provision of a welding tong having a pair of cooperating jaws pivotally connected and having wire receiving slots formed on corresponding sides which will serve, when spread apart, for securely clamping a wire which may be placed in the slots when the jaws are in position for aligning these slots.

Another object of the invention is the provision in a welding tong of a pair of slot bearing cooperating jaws constructed of sufficient width so that as the jaws become worn, the slots may be formed inwardly deeper and thus the life of the tong prolonged.

Another object of the invention is the provision in a welding tong of this class of a simple and effective means for binding the feed wire or electrode in position.

Another object of the invention is the provision in a welding tong of an insulated handle so constructed and arranged as to be light, easily handled, highly efficient in use and easily and quickly assembled.

Other objects will appear hereinafter.

The invention consists in the combination and arrangement of parts hereinafter described and claimed.

The invention will be best understood by a reference to the accompanying drawing which forms a part of this specification, and in which, Fig. 1 is a side elevational view of the invention.

Figure 1:
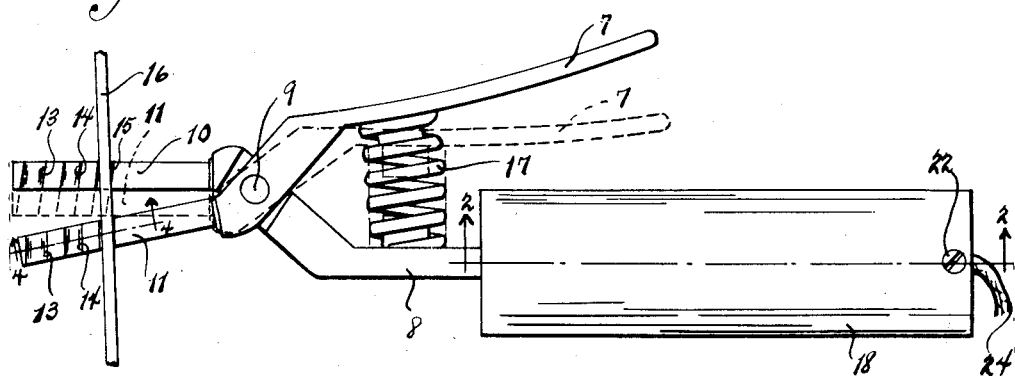
Figure 2:
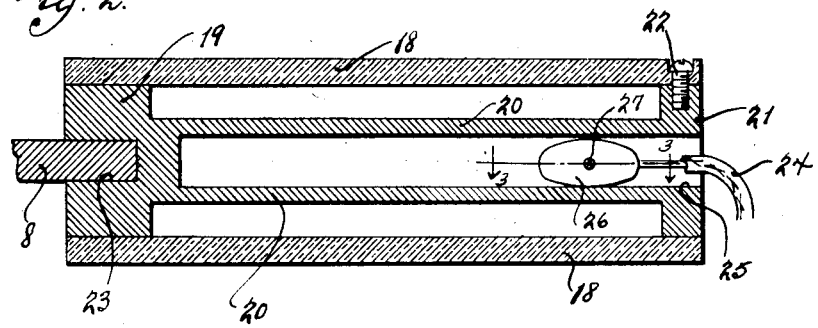
Fig. 2 is a view taken on line 2—2 of Fig. 1.
Figure 3:
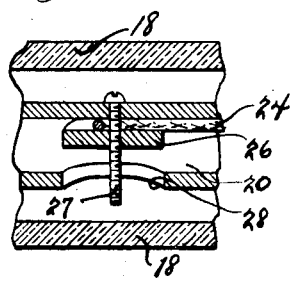
Fig. 3 is a sectional view taken on line 3—3 of Fig. 2.
Figure 4:
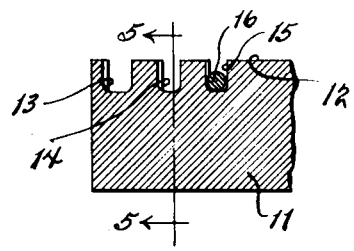
Fig. 4 is a sectional view taken on line 4—4 of Fig. 1.

The invention comprises a pair of handles 7 and 8 which are pivotally connected by the rivet 9. Each of these handles carry a jaw 10 or 11. Each of these jaws is similarly formed. In one edge 12 of the jaws are formed a plurality of slots 13, 14 and 15. These slots are at an angle to the planal faces of the jaws 10 and 11 and preferably at an angle of ten degrees. The slot 15 is smaller than the slot 14, and the slot 14 is smaller than the slot 13 so that these slots are arranged for reception of various sizes of wire 16. A spring 17 serves normally to maintain the handles spaced apart as shown in full lines in Fig. 1. When the handles are moved to the relative position shown by the dotted lines in Fig. 1, the jaws 10 and 11 will engage, and the slots in the jaw 11 will register with the slots in the jaw 10. When in this position the wire 16 may be inserted in the proper slot depending upon the size of the wire. When the pressure is then released on the handle 7 and the spring 17 causes these handles 7 and 8 to separate farther, the slots in the jaws will move out of alignment and thus the wire 16 will be clamped securely in position, the spring 17 being of sufficient tension to effect the proper binding or clamping. It will be noted that the smaller slots are positioned closer to the point of pivot so that the smaller wire when clamped by the jaws will be in the slots closer to the pivot. This is formed in this manner so that less strain will be exerted upon the smaller wire than on the larger wire.

An insulating gripping portion is mounted on the handle 8. This gripping portion comprises the tube 18 of insulating material which is adapted to snugly engage by a press fit the collar 19 formed on the metallic tube 20. The opposite end of the sleeve 18 snugly engages the collar 21 and is secured thereto by the set screw 22. The handle 8 is inserted into the socket 23 and is securely fixed by welding or in any other suitable manner. The feed wire 24 is inserted into the bore 25 of the tube 20. Cut from this tube 20 is an oval shaped plate 26 which is also curved transversely, and threading through which is a screw 27 which projects through the tube 20 diametrically opposite to the opening 28. This construction is such that upon threading of the screw 27, the plate 26 may be brought into clamping relation with the feed wire 24 and securely bind it against the tube 20. The handle 8 is of course formed from conducting material and its jaw 10 is preferably formed integral therewith.

Figure 5:
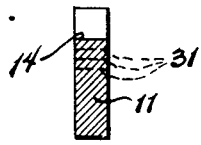
Fig. 5 is a sectional view taken on line 5—5 of Fig. 4.

In use, by forming the slots in the side of the jaws and forming the jaws wide as illustrated in the drawing and of small thickness, a maximum life of the tong becomes possible. When the sides in which the slots are formed wear, or become pitted or mis-shapen, the same may be milled off or trued up and the slots sunk deeper as shown by the dotted lines 31 in Fig. 5. I prefer to form these jaws for practical purposes of an inch width and a quarter inch thickness. It is obvious that the wire 16 may be easily and quickly moved longitudinally and gripped by the jaws on account of the manner of clamping the wire in the jaws.

In the use of a welding tong of this nature, it has been found that the molten material or weld will sometimes sputter and strike upon the welding tong and there adhere. This results in a pitting or a wearing of the tong, and an undesirable accumulation of foreign material on the tong. It is my purpose to so treat the tong as to prevent the accumulation of molten material on the tong. The handles 7 and 8 after fabrication are heated to approximately five hundred degrees and are then immersed in a heavy solution of creosote and there left to cool. The heating must be sufficient to open the pores of the metal to permit the creosote to enter the same. When thus treated, the weld or molten material will not adhere to the tong with the result that greater life of the tong is effected and more efficient work while using the tong becomes possible.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. A welding tong of the class described, comprising; a pair of pivotally mounted handles, each of said handles terminating in a flat, comparatively wide and comparatively thin jaw, there being formed in one of the side faces of each of said jaws a plurality of open slots, said slots being inclined to the planal faces of said jaws and adapted, upon movement of said jaws into approached relation, for registering with each other, the slots in said jaws, upon spreading of said jaws, moving out of registration with each other.

2. A welding tong of the class described, comprising a pair of pivotally mounted handles, each of said handles terminating in a flat, comparatively wide and comparatively thin jaw, there being formed in one of the side faces of each of said jaws a plurality of open slots, said slots being inclined to the planal faces of said jaws and adapted, upon movement of said jaws into approached relation, for registering with each other, the slots in said jaws, upon spreading of said jaws, moving out of registration with each other; and a spring for normally maintaining said jaws in spaced relation to each other.

3. A welding tong of the class described, comprising a pair of pivotally mounted handles, each of said handles terminating in a flat, comparatively wide and comparatively thin jaw, there being formed in one of the side faces of each of said jaws a plurality of open slots, said slots being inclined to the planal faces of said jaws and adapted, upon movement of said jaws into approached relation, for registering with each other, the slots in said jaws, upon spreading of said jaws, moving out of registration with each other; a spring for normally maintaining said jaws in spaced relation to each other; and a hand grip extension on one of said handles having a covering of insulation.

JOSEPH VILLARS.